United States Patent
Steiner et al.

(10) Patent No.: US 6,270,296 B1
(45) Date of Patent: Aug. 7, 2001

(54) FLUID PRESSURE OPERATED SPOTFACING AND COUNTERBORING TOOL

(75) Inventors: Rudolph Steiner, Fairport; Eugene E. Peek, Penfield; Randall Beaudin, Palmyra, all of NY (US)

(73) Assignee: R. Steiner Technologies, Inc., Fairport, NY (US)

( * ) Notice: Subject to any disclaimer, the term of this patent is extended or adjusted under 35 U.S.C. 154(b) by 0 days.

(21) Appl. No.: 09/492,371

(22) Filed: Jan. 27, 2000

(51) Int. Cl.$^7$ ................................................. B23B 51/00
(52) U.S. Cl. .......................... 408/59; 408/159; 408/180
(58) Field of Search ............................ 408/57, 59, 80, 408/81, 54, 93, 153, 158, 159, 180

(56) References Cited

U.S. PATENT DOCUMENTS

| | | | |
|---|---|---|---|
| 3,572,182 | * 3/1971 | MacDonald | 408/213 |
| 4,729,699 | * 3/1988 | Frazzoli | 408/159 |
| 5,704,743 | * 1/1998 | Goorsenberg | 408/159 |
| 5,839,860 | * 11/1998 | Steiner | 408/180 |
| 5,848,860 | * 12/1998 | Steiner | 408/159 |
| 5,927,911 | * 7/1999 | Steiner | 408/159 |

* cited by examiner

Primary Examiner—Daniel W. Howell
(74) Attorney, Agent, or Firm—Shlesinger Fitzsimmons Shlesinger

(57) ABSTRACT

A tool holder, which has a tool bit pivotal in a recess in one end thereof, extends coaxially through a generally bell shaped piston housing, and through the center of a piston slidably mounted on the holder for limited reciprocation in the housing axially thereof. The piston is urged by a compressing spring to a retracted position against one end of the housing, and has a reduced diameter annular wall that projects coaxially toward the end of the holder containing the tool bit. A tool actuating rod, which is pivotal in an axial bore in the holder, has on one end a lever which extends slidably into an axially extending helical slot formed in the annular piston wall, and is connected at its opposite end to the tool bit. When the piston is in its retracted position, the helical slot in its annular wall causes the actuating rod to swing the tool bit to an inoperative position within the holder recess. In use the end of the holder opposite the tool bit is connected to the drive spindle of a machine tool and a supply of air or fluid under pressure which passes through an axial bore and radial port in the holder to one side of the retracted piston causing the piston to advance it helical slot relative to the actuating rod lever thereby to pivot the tool bit out of the recess and into an operative position.

15 Claims, 3 Drawing Sheets

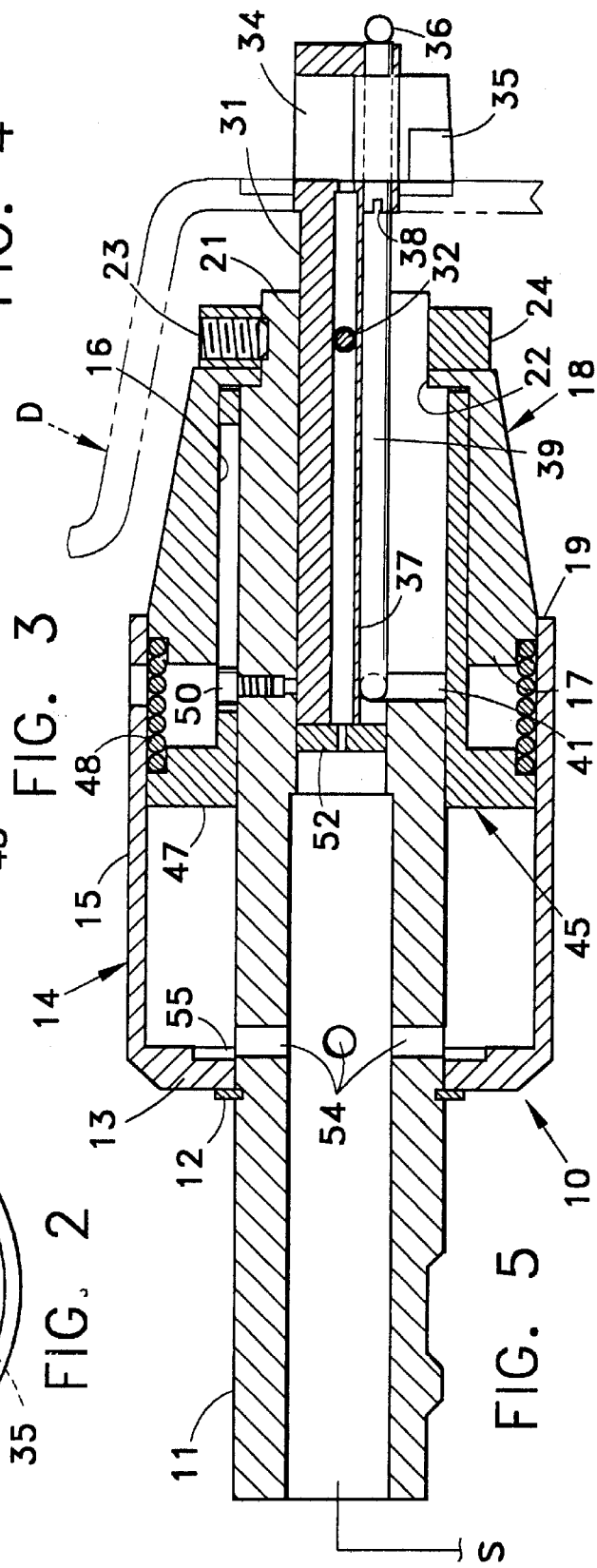

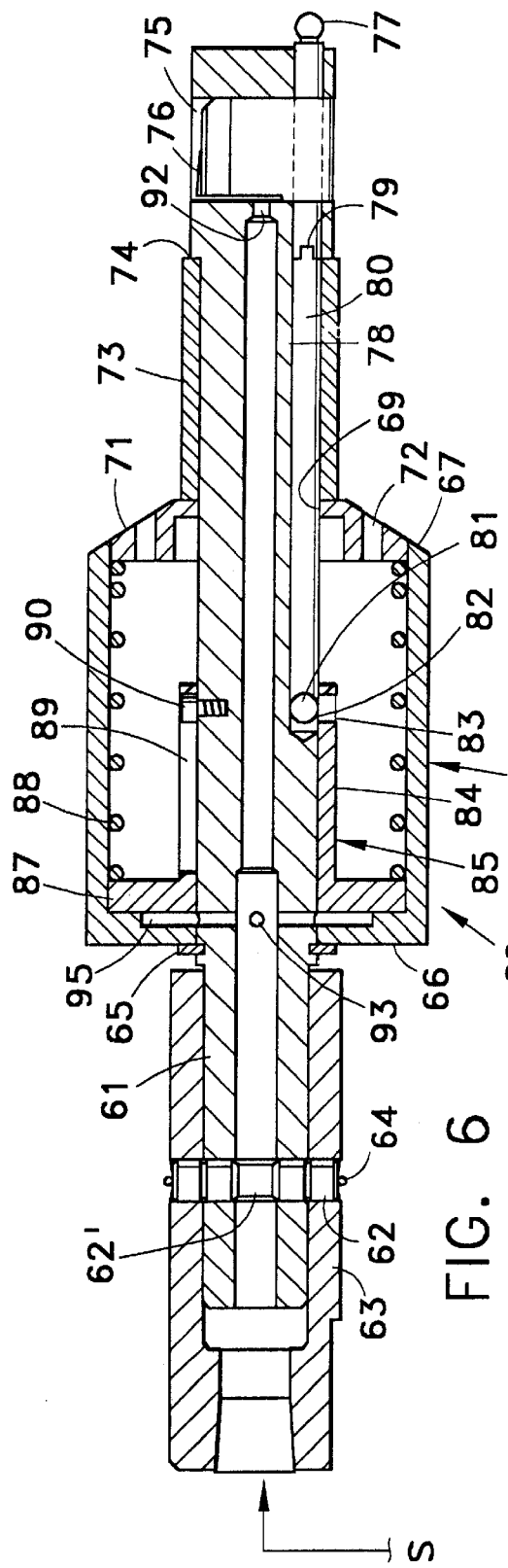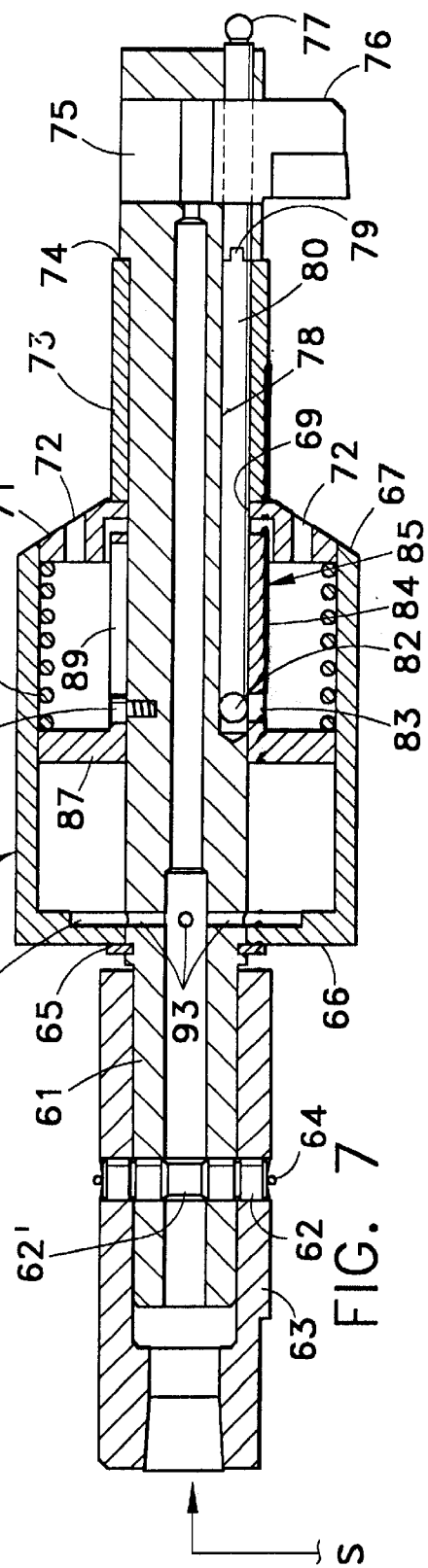

FLUID PRESSURE OPERATED SPOTFACING AND COUNTERBORING TOOL

BACKGROUND OF THE INVENTION

This invention relates to spotfacing and counterboring tools, and more particularly to an improved self-contained piston operated rod for pivoting a cutter blade between operative and inoperative positions relative to the tool housing. More particularly this invention relates to an improved tool of the type described having a housing which contains a fluid or compressed air operated piston that is reciprocated in opposite directions in the housing in order to effect pivotal movement of an associated spotfacing and counterboring tool between operative and inoperative positions relative to the tool housing.

There are currently available in the marketplace numerous spotfacing and counterboring tools which employ a cutter blade which is pivotal into and out of a recess in the tool body by various means. For example, U.S. Pat. Nos. 4,729,699, No. 3,806,271 and No. 4,475,852 require a portion of the associated tool to be engaged against the face of the work, which is to be spotfaced or counterbored, in order for the associated cutter element to be swung from an inoperative position within a recess in the tool to an operative position in which the cutter projects radially from the tool. In my U.S. Pat. No. 5,839,860 the associated tool bit is manipulated between its operative and inoperative positions by a fly wheel, which is carried by the tool body; and in my U.S. Pat. No. 5,848,860 this movement is effected by a spring-loaded actuating ring, which is rotated briefly relative to the associated tool body to manipulate the associated tool bit each time the position of the tool body is reversed.

It has also been customary heretofore to manipulate tools of the type described by means of the use of fluid pressure or compressed air. For example, U.S. Pat. No. 3,572,182 teaches the manipulation of the associated spotfacing tool bit by a piston which is shifted between two limit positions by compressed air or fluid. My U.S. Pat. No. 5,927,911 also dicloses a tool in which the cutter blade or tool bit is manipulated, at least in part, by a fluid coolant which is supplied to the tool under pressure. In that patent the fluid pressure responsive tool bit actuator is removably mounted on the exterior of the tool body for axial reciprocation thereon. Moreover, the actuator requires a series of additional parts for transmitting its reciprocation to tool bit manipulator that is mounted internally of the tool body.

Accordingly, it is an object of this invention to provide an improved, integrated tool of the type described in which the fluid pressure operated tool bit actuator is enclosed within the tool housing rather than being exposed on the exterior thereof.

Still another object of this invention is to provide an improved, self-contained fluid actuated tool of the type described in which the fluid pressure responsive actuator is enclosed within the tool housing and is connected substantially directly to the tool bit manipulator.

A further object of this invention is to provide an improved self-contained fluid actuated tool of the type described which has a minimal number of elements connecting the pressure-responsive tool actuator to the associated tool bit, so that the tool is substantially sturdier and more inexpensive to manufacture than prior such tools.

Other objects of the invention will be apparent hereinafter from the specification and from the recite of the appended claims, particularly when read in conjunction with accompanying drawings.

SUMMARY OF THE INVENTION

A cylindrical tool holder extends coaxially through a central opening in the closed end of a generally bell shaped piston housing, and through the center of a piston slidably mounted on the holder to reciprocate axially in the housing between its closed end and a spring retainer that surrounds the holder and closes the open end of the housing. The piston has at one end an enlarged diameter head normally urged by a coiled compression spring to a retracted position against the closed end of the housing and has a reduced diameter annular wall that projects coaxially from the head toward the spring retainer.

A tool actuating rod, which is mounted for limited pivotal movement in an axial bore in the holder, has on one end thereof a radial lag or lever which extends slidably into an axially extending helical slot formed in the annular piston wall, and is connected at its opposite end to a tool bit that is pivotal into and out of a recess formed in the end of the holder that extends beyond the spring retainer. When the piston is in its retracted position, the helical slot in its annular wall causes the actuating rod to be swing by its lever to a first limit position in which the tool bit is swung by the rod to an inoperative position within the holder recess. When the tool is to be placed in use, the end of the holder opposite the tool bit is connected to the drive spindle of a machine tool, and with an axial bore in the holder connected to a supply of air or fluid under pressure. The pressurized air or fluid passes through a radial port in the holder to a space between the retracted piston and the closed end of the piston housing thus causing the piston to advance axially of the holder during which movement the helical slot in the piston swings the activating rod in a direction to cause it to pivot the tool bit out of the recess and into an operative position.

THE DRAWINGS

FIG. 1 is an axial section view through the center of a fluid actuated spotfacing and counterboring tool made according to one embodiment of this invention, the associated tool bit being shown in its retracted or inoperative position, the tool being shown as it appears when it is used for back spotfacing and opening in a brake drum, portion of which is shown fragmentarily and in phantom by broken lines;

FIG. 2 is an end view looking at the right end of the tool as shown in FIG. 1, but illustrating in phantom in broken lines the tool bit as it appears when it has been swung 180° to its operative position;

FIG. 3 is a sectional view taken generally along the line 3—3 in FIG. 1 looking in the direction of the arrows;

FIG. 4 is a slightly enlarged detail view showing in fill the tool bit actuating piston as it appears when it is in the retracted position as shown in FIG. 1;

FIG. 5 is an axial section view through the tool similar to the view shown in FIG. 1, bit illustrating the tool bit actuating piston as it appears when it has been advanced into its tool actuating position;

Figure 1:
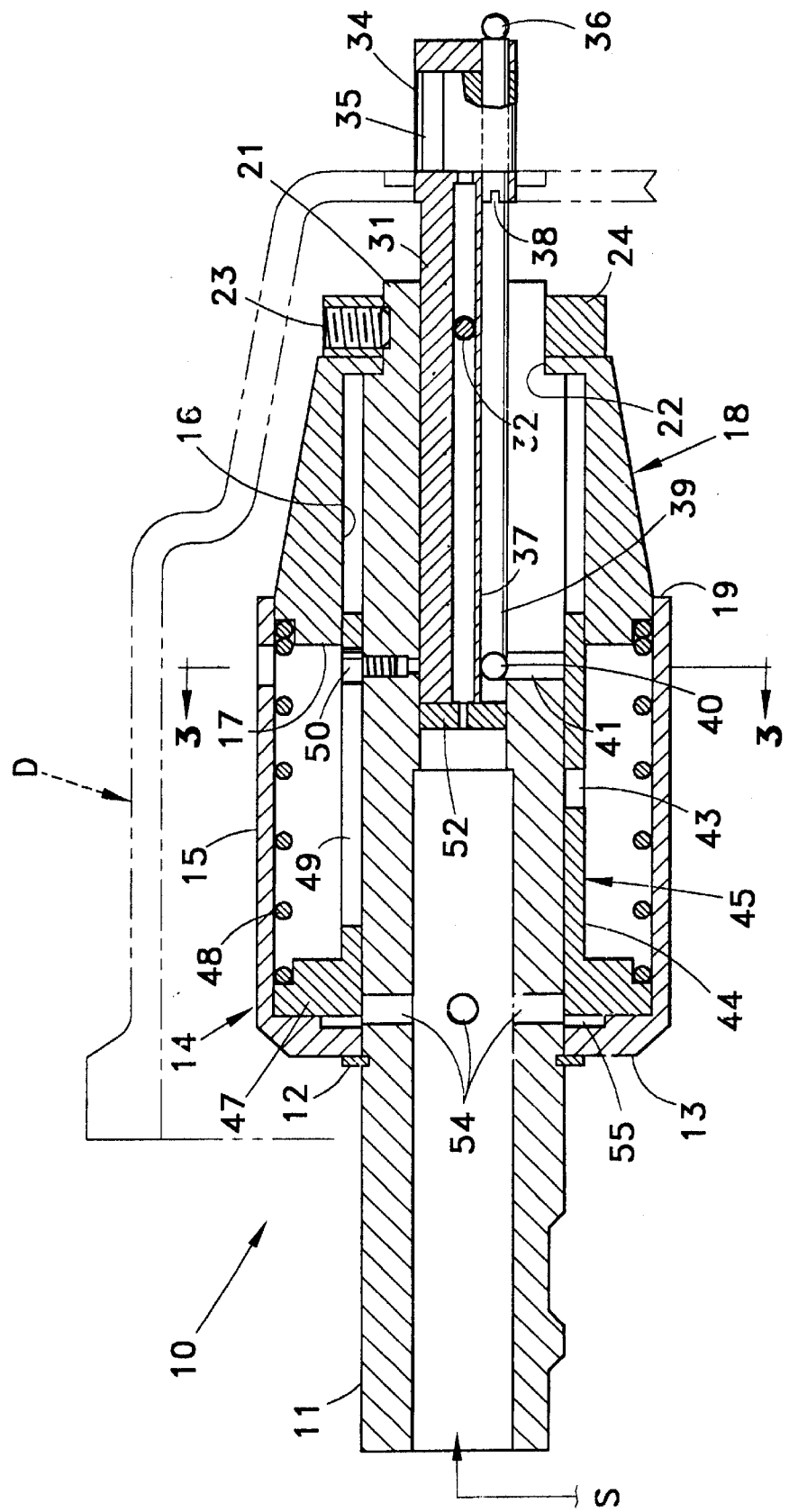

FIG. 6 is an axial section view through the center of a modified fluid actuated tool made according to a second embodiment of this invention, the tool bit actuating piston being shown in its retracted position in which it has placed the tool bit in an inoperative position; and FIG. 7 is another axial section view through this modified tool, bit illustrating the tool bit actuating position in its advanced position in which it has caused the associated tool bit to be swing from its inoperative to an operative position.

DETAILED DESCRIPTION OF THE PREFERRED EMBODIMENTS

Referring now to the drawings by numerals of reference, and first to the embodiment shown in FIGS. 1 to 5, 10 denotes generally a pressure operated spotfacing and counterboring tool comprising an elongate, axially bored drive shaft or tool holder 11 having secured coaxially in and projecting from an annular recess in its outer surface adjacent one end thereof a retainer ring 12. Shaft 11 extends beyond ring 12 and coaxially and successively through a central opening in the closed end 13 of a cylindrical, generally bell-shaped housing 14 that is seated against ring 12, through housing 14 in radially spaced relation to the annular wall 15 thereof, and coaxially through an axial bore 16 formed in the larger end 17 of a cone-shaped spring retainer 18, which extends coaxially into and closes the open end 19 of housing 14.

To secure spring retainer 18 against axial movement on the shaft 11, the portion of shaft 11 which extends through retainer 18 has on the terminal end thereof a reduced-diameter section 21, which extends coaxially through a central opening 22 formed in the closed, smaller end of the retainer 18. An annular clamp collar 24, which is secured by a set screw 23 coaxially on the reduced-diameter section 21 of the shaft 11, is seated against the outer surface of the closed end of retainer 18 to retain the inner surface thereof around opening 22 snugly against the annular shoulder formed on shaft 11 by its redlioed diameter section 21.

Secured coaxially in one end of the bore in shaft 11, the end thereof which extends through the spring retainer 18, and projecting coaxially beyond the reduced-diameter terminal end 21 of the shaft 11 is an axially bored cylindrical cutter body 31. Body 31 is secured against axial movement in the bore in shaft 11, and for rotation with the shaft by means of a drive or shear pin 32, which is secured at opposite ends to the shaft 11 and extends diametrally through a registering opening in the ciatter body 31. Adjacent its outer end body 31 has therein a recess 34 for accommodating a conventionally shaped spotfacing and counterboring tool bit 35, which is secured adjacent one end thereof to a pivot pin 36 which pivots intermediate its ends in one end of another axially extending bore 37 formed in the cltter body 31 in radially offset relation to its axial centerline. As shown in FIGS. 1 and 5, pivot pin 36 has a circular head section which projects beyond the terminal end of the body 31, and at its opposite or inner end has therein a diametrally extending notch or recess in which is seated a registering projection 38 formed on one end of an elongate tool bit actuating rod 39 which also is rotatably mounted in bore 37. At its inner end remote from pivot pin 36 the actuating rod 39 has integral therewith a radially extending lug or actuating lever 40 that extends intermediate its ends into a radial, arcuately shaped recess 41 that is formed in shaft 11 adjacent the larger end 17 of spring retainer 18, and extending for substantially 180° around shaft 11.

At its oiter end remote from bore 37 the actuating lever 40 extends slidably into a helical slot 43 formed in the annular wall 44 of a tool actuating piston, which is denoted generally by the numeral 45. The wall 44 projects at one end thereof (the right end as shown in FIGS. 1 and 5) coaxially and slidably into the annular space formed between shaft 11 and the surrounding bore wall formed on the retainer 18 by its bore 16. Integral with and surrounding the opposite end of the annular wall 44 is the enlarged-diameter head 47 of the piston 45. The outer peripheral surface of the head 47 is slidably engaged with the inner peripheral surface of the housing wall 15, and normally is urged by a coiled compression spring 48 into a retracted position in which it is seated against the inner surface of the end wall 13 of housing 14, as shown in FIG. 1. Spring 48 is mounted in housing 14 with its coil slidably engaged with the inner peripheral surface of the housing wall 15, and with opposite ends of the spring seated in annular recesses formed in the confronting ends of the piston head 47 and retainer 18. As noted hereinafter, the piston head 47 is disposed to be reciprocated between the retracted position as shown in FIG. 1, and an advanced position (FIG. 5) in which it effects pivotal movement of the tool bit 35 from its closed or inoperative position as shown in FIG. 1 to its open or operative position as shown by full lines in FIG. 5, and by broken lines in FIG. 2.

To control the axial reciprocation of the piston head 47, the annular wall 45 of the piston has therein intermediate its ends an elongate, axially and linearly extending slot 49 into which extends the head 50 of a guide bolt, the shank of which is secured in a radial opening formed in the shaft 11 in registry with, and diametrically opposite the arctiately shaped recess 41 in the shaft. The head 50 of the guide bolt thus performs two functions, preventing rotation of the piston 45 relative to shaft 11 during reciprocation of the piston on the shaft; and also head 50 transmits the rotation of shaft 11 to the piston 45, so that the shaft and piston rotate in unison.

As noted hereinafter, in use, the fluid or air tinder pressure is adapted to be supplied by a source S into the end of the bore in shaft 11 remote from the end containing the clutter body 31. A restrictor disc 52, which is secured over the inner end of the cltter body 31, causes the pressure of the entering fluid to increase, thereby forcing the fluid radially through a plurality (four in the embodiment illustrated) of radial openings 54 formed in the annular wall of shaft 41 with the axes thereof disposed in a common plane which is substantially coplanar with the end of the piston head 47 when it is engaged with the inside surface of the housing end wall 13. In its inside surface the end wall 13 has therein a rather shallow, annular recess 55 which is disposed coaxially of the housing 15, and which communicates with the outer ends of the ports or openings 54 where they open on the outer periphery of shaft 11. Consequently, the fluid Linder pressure from the bore in shaft 11 is forced through the openings 54 and into the recess 55 it begins to ilrge the piston head 47 axially in the housing 14 against the resistance of the spring 48. This buildup in pressure between the wall 13 and the head 47 causes the piston 45 to be advanced from its retracted position in FIG. 1 to its fully advanced position as shown in FIG. 5, wherein the annular wall 44 of the piston has advanced axially into the bore 16 in spring retainer 18 to the point where the terminal end of the wall 44 is disposed adjacent to the closed end of retainer 18.

During this axial advancement of the piston 45, the helical slot 43 in its annular wall 44 passes over the actuating lever 40 causing the lever to be pivoted approximately 180° from its fill line position shown in FIGS. 1 and 3, to its tool operating position as shown in phantom by broken lines in FIG. 3. Since lever 40 is integral with the actuating rod 39, the rod 39 and the tool bit pivot pin 36, which is attached thereto, are likewise rotated 180°, in turn causing the tool bit 35 to be rotated from its inoperative or closed position as shown in FIG. 1 to its operative position of which it projects radially from the cavity or recess 34 in the tool body 31. With the tool bit 35 now in its operative position, the tool drive spindle (not illustrated), which is attached in a conventional manner to the end of the shaft 11 into which fluid under pressure is supplied, can now be operated to cause the tool bit 35 to back spotface or counterbore an opening in a brake drum D, or the like, a portion of which is shown fragmentarily by broken lines in FIGS. 1 and 5.

After the counterboring or back spotfacing operation has been completed, the fluid pressure in the bore in shaft 11 is released in any conventional manner, thereby permitting the spring 48 to return the piston head 47 to its retracted position shown in FIG. 1. During such movement, of course, the helical slot 43 in the piston 45 will cause the actuating lever 40 to be rotated back to the tool retracting position as shown in FIG. 1, whereby the tool bit 35 will be returned to its inoperative position as shown in FIG. 1. Also, if desired, the restrictor 52 may have in the center thereof a small opening which communicates with an axial bore in the tool holder 31, and the opposite end of which communicates through still another small opening with the tool bit cavity or recess 34. A small quantity of the fluid entering the shaft 11 can therefore be employed to clear chips, and the like from the cavity 34.

Referring now to the embodiment shown in FIGS. 6 and 7, 60 denotes generally a modified or integrated tool having an elongate, axially bored tool holder 61 which is secured at one end thereof by shear pin 62 coaxially in one end of an axially bored shank 63. The opposite ends of shank 63 is adapted to be secured in a conventional manner to the drive spindle of an associated tool mechanism. Pin 62 extends intermediate its ends through, and is releasably sectored in registering, radial openings in the holder 61 and shank 63 by a rigid loop or ring 64 which is seated in an annular recess in shank 63 to overlie opposite ends of the pin 62.

Adjacent the end thereof which is secured in the shank 63, the holder 61 has secured coaxially in and projecting from an annular recess in its oeter surface a retainer ring 65. In a manner similar to the shank 11 in the first embodiment, the holder 61 extends beyond ring 65 and coaxially and successively through a central opening in the closed end 66 of a cylindrical, generally bell-shaped housing 68 that is seated against ring 65, coaxially through housing 68 in radially spaced relation to its annular wall, and coaxially through an axial bore 69 formed in the smaller end of a cone-shaped spring retainer 71, the conter-bored larger end of which extends coaxially and slidably into and closes the open end 67 of housing 68.

Holder 61 extends coaxially beyond the smaller end of container 71 and has rotatably mounted and coaxially mounted thereon a rotary pilot sleeve 73, one end of which is engaged with the smaller end of retainer 71, and the other end of which is engaged with an annular shoulder 74 formed on holder 61 adjacent the end thereof remote from shank 63, and which end is slightly larger in diameter than the portion of holder 61 upon which the sleeve 73 rotates. This slightly enlarged diameter end of holder 61 has therein a recess 75 accommodating a conventionally shaped spotfacing and counterboring tool which is secured adjacent one end thereof to a pivot pin 77 that pivots intermediate its ends in one end of an axially extending bore 78 formed in the citter body 61 in axially offset relation to its axial centerline. As shown in FIGS. 6 and 7, pin 76 has a circular head section which projects beyond the terminal end of the tool body 61, and at its opposite or inner end has therein a diametrally extending notch or recess in which is seated a registering projection 79 formed on one end of an elongate, tool bit actuating rod 80, which is also rotatably mounted in bore 78. At its inner end remote from pivot pin 77, rod 80 has thereon an integral, radially extending activating lever 81 that extends intermediate its ends into a radial, arciately shaped recess 82 that is formed in holder 61 for essentially the same purpose as the recess 41 that is formed in shaft 11 of the first embodiment. As in the case of the above-noted recess 41, the recess 82 in holder 61 also extends substantially 180° around holder 61.

At its oenter end remote from the axial bore in the holder 61 actuating lever 81 extends slidably into a helical slot 83 formed in the annular wall 84 a tool actuating piston, which is denoted generally by the numeral 85. Although not illustrated in detail, it woiuld be understood that the helical slot 83 is similar in configuration to, and functions in a manner similar to the slot 43 formed in the tool activating piston 45 of the first embodiment. Integral with and surrounding one end of the annular wall 84 of the piston 85 (the left end as shown in FIGS. 6 and 7) is the enlarged diameter head of the piston. The outer peripheral surface of the piston head 87 is slidably engaged with the inner peripheral surface of the annular wall section of housing 68, and normally is urged by a coiled compression spring 88 into the retracted position in which it is seated against the inner surface of the end wall 66 of housing 68, as shown in FIG. 6. Spring 88 is mounted in housing 68 between the retainer 71 and the piston head 87, and with its coil slidably engaged with the inner peripheral surface of the annular wall of housing 68. The piston head 87 is disposed to be reciprocated between the retracted position (FIG. 6) and its advanced or tool bit actuating position (FIG. 7) in which it effects pivotal movement of the tool bit 76 from its closed or inoperative position (FIG. 6) to its open or operative position as shown in FIG. 7. To control its axial reciprocation the annular wall 84 of the piston head has therein intermediate its ends an elongate, axially and linearlly extending slot 89 into which extends the head 90 of the guide bolt, the shank of which is secured in a radial opening formed in the holder 61 in registtry with, and diametrally opposite the arcutately shaped recess 81 in holder 61. Head 90 thins prevents rotation of the piston 85 relative to the holder 61, and transmits the rotation of holder 61 to the piston 85 so that the holder 61 and piston 85 rotate in unison.

In a manner similar to the first embodiment, fluid or air under pressure is adapted to be supplied by a source S through the bore in the shank 63 to the inlet end or left end of the axial bore of the holder 61 as shown in FIGS. 6 and 7. The opposite end of this axial bore is restricted by a substantially reduced-diameter bore or opening 92 which communicates with the tool bit recess 75. Consequently, the majority of the pressurized air or fluid which enters the inlet end of the axial bore in holder 61 is forced through a plurality of angularly spaced, radial openings 93 formed in holder 61 to communicate at their outer ends with a shallow, annular recess 95 formed on the inside surface of the closed end 66 of housing 68. Conseqiuently, the fluid finder pressure entering recess 95 forces the piston head 87 axially in housing 68 against the resistance of spring 88 and into its advanced, tool bit operating position as shown in FIG. 7, wherein a portion of the annular wall 84 of the piston remote from its head 87 projects coaxially into a counterbore formed in the larger end of retainer 71 coaxially of its bore 69. During this advance of piston 85 back pressure relief holes 72 that are formed through retainer 71 radially oiutwardly of its cointerbore, prevent the build tip of any fluid pressure in housing 68 between retainer 71 and the piston head 87. Also during this axial advance of the piston 85, the helical slot 83 in the piston causes the actuating lever 82 to rotate the actuating rod 80 in a direction to swing the tool bit 76 from its retracted or inoperative position as shown in FIG. 6, to its advanced, or operative position in which it projects radially outwardly from holder 61 as shown in FIG. 7. During the advance of the piston 85, a small portion of pressurized air or fluid is permitted to pass through the restricted opening 92 into the tool bit recess 75 to clean chips and foreign matter therefrom.

As in the preceding embodiment, when a counterboring or back spotfacing operartion has been completed, the florid pressure in the bore of the holder 61 is released in a conventional manner, thereby permitting spring 88 to retuirn the piston 85 to its retracted position as shown in FIG. 6, during which movement the helical slot 83 in the annular wall of the piston returns the tool bit 76 to its retracted or inoperative position within recess 75.

From the foregoing, it will be apparent that the present invention provides a relatively simple, but improved fluid pressure operated spotfacing and counterboring tools, which minimize the amount of operating parts heretofore required for effecting such spotfacing and counterboring operations, and which improved tools are readily adaptable to the operating spindles of existing machine tools. While the shear pin 62 shown in the second embodiment extends transversely across the bore in the tool holder 61, it will be apparent from the drawings that it has intermediate its ends a rediiced-diameter section 62' which extends transversely of the bore in the holder 61, and therefore provides ample room for pressurized fluid or air to pass beyond the pin 62 to the openings 93 in the holder.

Also, while the second embodiment as shown in FIGS. 6 and 7 utilizes a separate shank section 63, it will be apparent to one skilled in the art, that if desired, the shank section 63 in the associated shear pin 62 could be eliminated by forming the associated end of the holder 61 to be sectred, in use, directly to the operating spindle of the associated machine. In this embodiment, if desired, the housing 68 may be mounted for movement axially relative to retainer 71 and holder 61, and away from ring 65 to shift piston 85 against the resistance of spring 88 to an advanced, tool bit actuating position. It will be obvious also to one skilled in the art that this invention is capable of still further modification, and that this application is intended to cover any such modifications as may fall within the scope of one skilled in the art, or within the recital of the appended claims.

What is claimed is:

1. A spotfacing and counterboring tool, comprising
a cylindrical tool holder,
a generally bell-shaped piston housing surrounding said holder intermediate the ends thereof, and having an annular wall open at one end and closed at its opposite end by an integral, transverse end wall having therein a central opening surrounding said holder,
a spring retainer surrounding said holder and mounted coaxially in and closing the open end of said annular wall of said housing,
a piston mounted on said holder in said housing for reciprocation axially thereof between said end wall and said spring retainer,
said piston having an enlarged-diameter head section confronting at one side thereof upon said end wall of said housing, and having a reduced diameter annular wall section projecting coaxially from the opposite side of said head section thereof toward said spring retainer,
a spring mounted in said housing between said retainer and said piston and operative normally to urge said piston to a retracted position in which said one side of said head section thereof is seated against said housing end wall,
said holder projecting at one end thereof coaxially beyond said spring retainer and having a tool bit mounted in a recess therein for pivotal movement between an inoperative position within said recess, and an operative position in which the tool bit projects from the recess,
means for connecting the opposite end of said holder to a machine tool for rotation thereby, and for supplying fluid under pressure throiugh an axial bore in said holder to said one side of said head section of said piston to shift said piston axially from its retracted position to an advanced position in said housing,
a tool bit actuating rod mounted in said holder for limited pivotal movement about an axis extending parallel to the axial centerline of said holder and connected at one end to said tool bit to impart pivotal movement thereto, and
means connecting said rod adjacent its opposite end to said piston and operative when said piston is moved to its retracted position to pivot said rod in a direction to move said tool bit to its inoperative position in said recess, and operative to pivot said rod in the opposite direction to move said tool bit to its operative position when said piston is moved to its advanced position.

2. A tool as defined in claim 1, including means connecting said piston to said holder for rotation therewith by said machine tool while permitting limited axial movement of said piston relative to said holder.

3. A tool as defined in claim 2, wherein said means connecting said piston to said holder comprises a pin secured at one end in said holder and projecting at its opposite end slidably into an axially extending slot formed in said annular wall section of said piston to extend parallel to the axial centerline thereof.

4. A tool as defined in claim 1, wherein said means connecting said rod to said piston comprises a lever secured at one end to said rod and projecting radially therefrom through an arcuate recess in said holder and slidably into a slot formed in said annular wall section of said piston to extend axially thereof in a helical path.

5. A tool as defined in claim 1 wherein said holder has therein at least one radial port communicating at one end with the axial bore in said holder and at its opposite end with a recess formed in the surface of said housing end wall engaged by said head section of the piston when in its retracted position.

6. A tool as defined in claim 1, including a pilot sleeve rotatably mounted on said holder adjacent said one end thereof between said spring retainer and the recess in which said tool bit is mounted.

7. A tool as defined in claim 1, wherein said holder includes a cylindrical cltter body having said recess formed in one end thereof, and having the opposite end thereof secured in said axial bore in said holder coaxially thereof.

8. A tool as defined in claim 7, wherein said cutter body has therethrough an axial bore communicating at one end with said recess and at its opposite end with the axial bore in said holder, and the axial bore in said cutter body is smaller in diameter than the axial bore in said holder.

9. A tool as defined in claim 8, wherein said actuating rod is pivotally mounted in an axially extending bore formed in said cutter body in radially spaced parallel relation to the axial bore thereof.

10. A tool as defined in claim 1, wherein, said opposite end of said holder projects axially beyond and externally of said closed end of said piston housing, and said means for connecting said opposite end of said holder to a machine tool includes a sleeve shank removably secured on said opposite end of said holder coaxially thereof and disposed to be connected to a drive spindle of said machine.

11. A tool as defined in claim 1, wherein said annular wall section of said piston registers coaxially with and is insertable part way into an annular recess in said spring retainer when said piston is shifted to its advanced position.

12. A tool as defined in claim 1, including means securing said spring retainer against axial movement on said tool holder.

13. A tool as defined in claim 1, wherein said means connecting said rod to said piston pivots said rod approximately 180° when said piston is moved from one to the other of its advanced and retracted positions, respectively.

14. A tool as defined in claim 13, wherein said means connecting said rod to said piston functions to secure said rod against axial movement relative to said holder.

15. A tool as defined in claim 1, wherein said axial bore in said holder communicates at one end thereof with said recess in said holder.

* * * * *